US010169726B2

United States Patent
Aganagic et al.

(10) Patent No.: US 10,169,726 B2
(45) Date of Patent: Jan. 1, 2019

(54) SYSTEMS, METHODS AND APPARATUS FOR IMPROVED OPERATION OF ELECTRICITY MARKETS

(71) Applicant: Siemens Industry, Inc., Alpharetta, GA (US)

(72) Inventors: Muhamed Aganagic, Minneapolis, MN (US); Sankaran Rajagopal, Plymouth, MN (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 726 days.

(21) Appl. No.: 14/507,892

(22) Filed: Oct. 7, 2014

(65) Prior Publication Data

US 2015/0221030 A1 Aug. 6, 2015

Related U.S. Application Data

(60) Provisional application No. 61/936,500, filed on Feb. 6, 2014.

(51) Int. Cl.
*G06Q 10/00* (2012.01)
*G06Q 10/06* (2012.01)
(Continued)

(52) U.S. Cl.
CPC ....... *G06Q 10/0631* (2013.01); *G06Q 10/063* (2013.01); *G06Q 30/0283* (2013.01);
(Continued)

(58) Field of Classification Search
CPC ............. G06Q 10/063; G06Q 10/0631; G06Q 30/0283; G06Q 30/0206; G06Q 30/0202;
(Continued)

(56) References Cited

U.S. PATENT DOCUMENTS

| | | | |
|---|---|---|---|
| 7,343,360 B1* | 3/2008 | Ristanovic | G06Q 30/08 705/412 |
| 2005/0137959 A1* | 6/2005 | Yan | G06Q 20/102 705/37 |
| 2012/0010758 A1* | 1/2012 | Francino | G05B 17/02 700/291 |

OTHER PUBLICATIONS

Hogan, William W. "Multiple Market-Clearing Prices, Electricity Market Design and Price Manipulation." The Electricity Journal 25.4 (2012): 18-32. Web.*

* cited by examiner

*Primary Examiner* — William S Brockington, III

(57) ABSTRACT

Embodiments provide systems and methods for operating a power system to deliver energy. Embodiments include receiving constraints within a scheduling and pricing system; receiving bids with corresponding generation capacity and offers with corresponding load requirements, within the scheduling and pricing system; applying the constraints, the bids, the generation capacity, the offers, and the load requirements to a quadratic programming model of a market clearing system within the scheduling and pricing system; determining market clearing prices and corresponding generation and load schedules based on optimizing the quadratic programming model of a market clearing system; distributing the market clearing prices and corresponding generation and load schedules to a billing and settlement system; distributing the generation and load schedules to a generation control and load management system; and directing operation of generator resources and managing loads to deliver energy to customers based on the generation and load schedules. Numerous other aspects are provided.

17 Claims, 5 Drawing Sheets

(51) Int. Cl.
*G06Q 30/02* (2012.01)
*G06Q 40/04* (2012.01)
*G06Q 50/06* (2012.01)
*G06Q 10/10* (2012.01)

(52) U.S. Cl.
CPC ..... *G06Q 10/1097* (2013.01); *G06Q 30/0206* (2013.01); *G06Q 40/04* (2013.01); *G06Q 50/06* (2013.01)

(58) Field of Classification Search
CPC .......... G06Q 40/04; G06Q 50/06; G05F 1/66; Y04S 50/10
See application file for complete search history.

SYSTEMS, METHODS AND APPARATUS FOR IMPROVED OPERATION OF ELECTRICITY MARKETS

RELATED APPLICATIONS

The present application claims priority to U.S. Provisional Application No. 61/936,500 titled "Unique Prices for Energy Markets" filed Feb. 6, 2014 which is incorporated herein by reference for all purposes.

FIELD

The present invention relates to operating electricity markets (including markets for energy and ancillary services), and more specifically to improving the economic dispatch model used for such markets to deliver power.

BACKGROUND

Electricity is by its nature difficult to store and has to be available on demand. Consequently, unlike other products, it is not possible, under normal operating conditions, to keep it in stock, ration it or have customers queue for it. Furthermore, demand and supply vary continuously. There is therefore a physical requirement for a controlling agency, the system operator, to coordinate the dispatch of generating units to meet the expected demand of the system across the transmission grid. If there is a mismatch between supply and demand, the generators speed up or slow down causing the system frequency (either 50 or 60 hertz) to increase or decrease. If the frequency falls outside a predetermined range the system operator will act to add or remove either generation or load. In addition, the laws of physics determine how electricity flows through an electricity network. Hence the extent of energy lost in transmission and the level of congestion on any particular branch of the network will influence the economic dispatch of the generation units.

The scope of each electricity market includes the transmission grid or network that is available to the wholesalers, retailers and the ultimate consumers in any given geographic area. Markets may extend beyond national boundaries.

In order to insure consistent and reliable delivery of electricity to businesses, hospitals, homes, etc., electricity markets are structured to efficiently and timely effect transactions. In economic terms, electricity is a commodity capable of being bought, sold and traded. An electricity market is a system for effecting purchases, through bids to buy; sales, through offers to sell; and short-term trades, generally in the form of financial or obligation swaps. Bids and offers use supply and demand principles to set the price. Most electricity markets, and many other markets, function in accordance with a bid-based security constrained economic dispatch model. Wholesale transactions (e.g., bids and offers) in electricity are typically cleared and settled by the market operator or a special-purpose independent entity charged exclusively with that function. Market operators do not clear trades but often require knowledge of the trade in order to maintain generation and load balance.

For an economically efficient electricity market to be successful it is helpful that a number of criteria are met, namely the existence of a coordinated spot market that has bid-based, security-constrained, economic dispatch. The system price in the day-ahead market is, in principle, determined by matching offers from generators to bids from consumers at each node to develop a classic supply and demand equilibrium price, usually on an hourly interval, and is calculated separately for sub-regions in which the system operator's load flow model indicates that constraints will bind transmission imports.

The theoretical prices of electricity at each node on the network is a calculated "shadow price", in which it is assumed that one additional kilowatt-hour is demanded at the node in question, and the associated incremental cost to the system that would result from the optimized re-dispatch of available units establishes the hypothetical production cost of the hypothetical kilowatt-hour. This is known as locational marginal pricing or nodal pricing and is used in some deregulated markets, most notably in the PJM Interconnection, ERCOT, New York, and New England markets in the USA and in New Zealand.

As an illustrative example, new technology is available and has been piloted by the US Department of Energy that may facilitate real-time market pricing even down to the retail level. A potential use of event-driven service-oriented architecture (SOA) could be a virtual electricity market where, for example, home clothes dryers can bid on the price of the electricity they use in a real-time market pricing system. The real-time market price and control system could turn home electricity customers into active participants in managing the power grid and their monthly utility bills. Customers can set limits on how much they would pay for electricity to run a clothes dryer, for example, and electricity providers willing to transmit power at that price would be alerted over the grid and could sell the electricity to the dryer.

On one side, consumer devices can bid for power based on how much the owner of the device were willing to pay, set ahead of time by the consumer. On the other side, suppliers can enter bids automatically from their electricity generators, based on how much it would cost to start up and run the generators. Further, the electricity suppliers could perform real-time market analysis to determine return-on-investment for optimizing profitability or reducing end-user cost of goods.

Event-driven SOA software could allow homeowners to customize many different types of electricity devices found within their home to a desired level of comfort or economy. The event-driven software could also automatically respond to changing electricity prices, in as little as five-minute intervals. For example, to reduce the home owner's electricity usage in peak periods (when electricity is most expensive), the software could automatically lower the target temperature of the thermostat on the central heating system (in winter) or raise the target temperature of the thermostat on the central cooling system (in summer).

To realize such improved systems, stable, efficient electricity markets are desirable to insure consistent delivery of energy at prices that do not have dramatic changes. Therefore, what is needed are systems, methods and apparatus for improved operation of electricity markets.

SUMMARY

In some embodiments, a method of operating a power system to deliver energy is provided. The method includes receiving constraints within a scheduling and pricing system; receiving bids with corresponding generation capacity and offers with corresponding load requirements, within the scheduling and pricing system; applying the constraints, the bids, the generation capacity, the offers, and the load requirements to a quadratic programming model of a market clearing system within the scheduling and pricing system; determining market clearing prices and corresponding generation and load schedules based on optimizing the quadratic programming model of a market clearing system; distributing the market clearing prices and corresponding generation and load schedules to a billing and settlement system; distributing the generation and load schedules to a generation control and load management system; and directing operation of generator resources and managing loads to deliver energy to customers based on the generation and load schedules.

In other embodiments, a system for operating a power system to deliver energy is provided. The system includes a scheduling and pricing system including a quadratic programming model of a market clearing system; a plurality of input information sources in communication with the scheduling and pricing system; a generation control and load management system in communication with the scheduling and pricing system; and a billing and settlement system in communication with the scheduling and pricing system. The scheduling and pricing system is operative to receive constraints, bids with corresponding generation capacity, and offers with corresponding load requirements from the plurality of input information sources. The scheduling and pricing system is further operative to determine market clearing prices and corresponding generation and load schedules based on optimizing the quadratic programming model of a market clearing system with the received constraints, bids with corresponding generation capacity, and offers with corresponding load requirements; distribute the market clearing prices and corresponding generation and load schedules to the billing and settlement system; and distribute the generation and load schedules to the generation control and load management system. The generation control and load management system is operative to direct operation of generator resources and manage loads to deliver energy to customers based on the generation and load schedules.

In still other embodiments, an alternative system for operating a power system to deliver energy is provided. The alternative system includes a processor; and a memory coupled to the processor and storing processor executable instructions to receive constraints within a scheduling and pricing system; receive bids with corresponding generation capacity and offers with corresponding load requirements, within the scheduling and pricing system; apply the constraints, the bids, the generation capacity, the offers, and the load requirements to a quadratic programming model of a market clearing system within the scheduling and pricing system; determine market clearing prices and corresponding generation and load schedules based on optimizing the quadratic programming model of a market clearing system; distribute the market clearing prices and corresponding generation and load schedules to a billing and settlement system; distribute the generation and load schedules to a generation control and load management system; and direct operation of generator resources and manage loads to deliver energy to customers based on the generation and load schedules.

Numerous other aspects are provided in accordance with these and other aspects of the invention. Other features and aspects of the present invention will become more fully apparent from the following detailed description, the appended claims and the accompanying drawings.

DETAILED DESCRIPTION

Embodiments of the present invention provide systems, apparatus and methods for operating electricity markets (e.g., markets for both energy and related ancillary services) based on an improved economic dispatch model to better deliver power. The economic dispatch model is improved by incorporating market clearing price variables directly into the model to avoid incorrect price signals due to a multiplicity of market clearing prices. As noted above, many, if not all, electricity markets operate based on bid-based security constrained economic dispatch. The economic dispatch process produces optimal schedules (i.e., awards) and locational prices that are used to clear the market. Unfortunately however, there can be a multiplicity or continuous range of market clearing prices that result from the economic dispatch process. A multiplicity of schedules can also result.

The problem can result from the market operators (e.g., Independent System Operators (ISOs)) publishing a single set of prices for settlement and other purposes and that any single set of prices provides an incorrect price signal. Often, the range of prices that the market operators publish can have significant variation (e.g., 10 or more dollars per MWh). This ambiguity of market clearing prices particularly impact bilateral trades that are settled based on the market clearing prices. An additional problem is that the market is very sensitive to very small variations in supply and demand in the sense that such small variations result in large changes in the prices.

Embodiments of the present invention address these problems by improving the mathematical model used for economic dispatch by incorporating the market clearing price variables directly into the model in two ways. First, the present invention introduces a relaxation to all pricing constraints that are epsilon proportional to the shadow (i.e., market clearing) price of the constraints. The epsilon parameter is chosen as a very small positive number, for example, approximately $10^{-6}$. Other values can be used. Second, a sum of squares of the market clearing prices multiplied by ½ epsilon is added into the objective function of the model. These two improvements to the model insure that the modified economic dispatch will always result in a unique set of market clearing prices and that the prices are stable in the sense that small variations of data produce only small variations in the prices.

Figure 1:
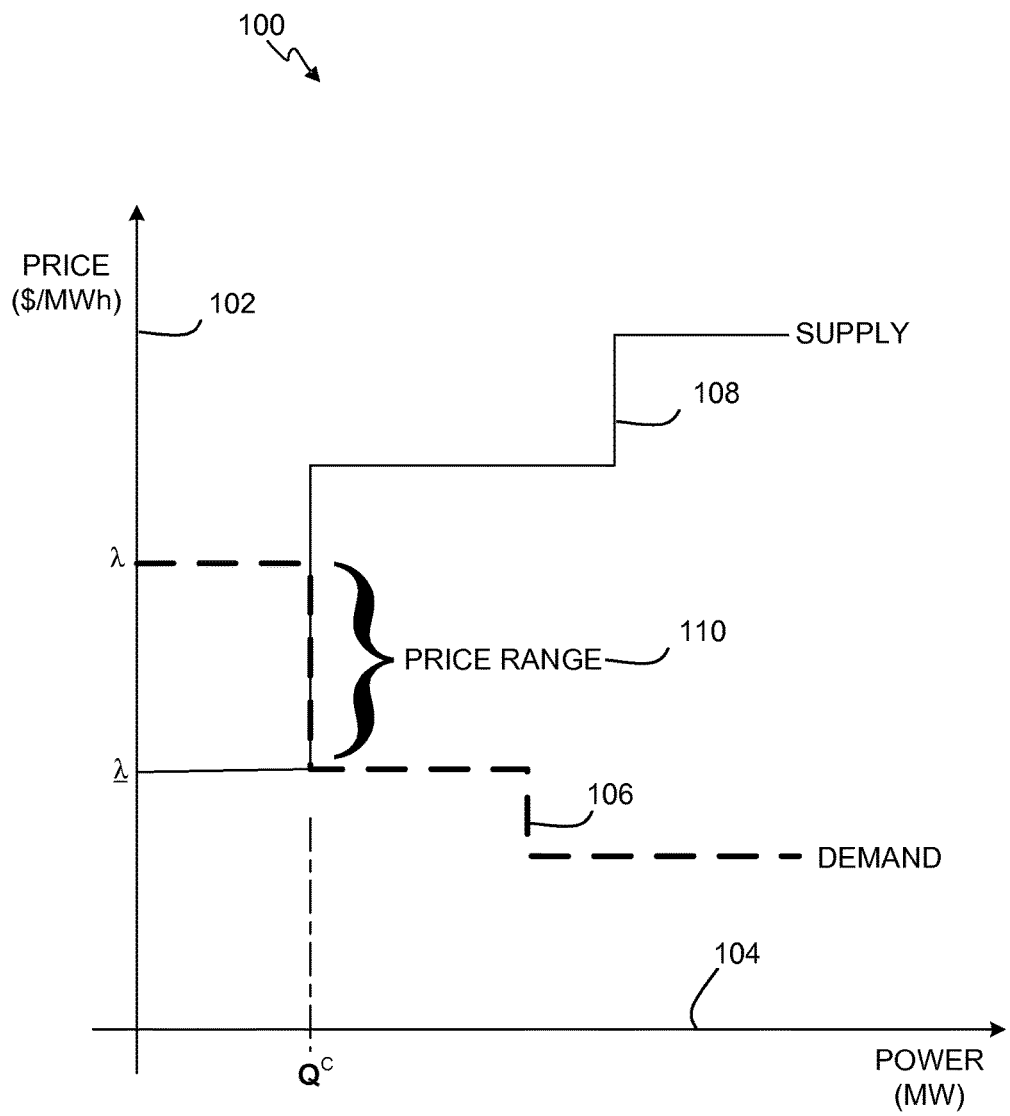
FIG. 1 depicts an example supply and demand graph provided to illustrate aspects of the present invention.

To better understand the multiplicity of prices problem, consider the single location step-wise supply and demand graph 100 depicted in FIG. 1. The y-axis 102 represents prices in dollars per MW and the x-axis 104 represents power in MW. The demand curve 106 intersects with the supply curve 108 over a range of prices 110 from $\lambda$ to $\underline{\lambda}$. The range of prices 110 means there is ambiguity in setting the price. In other words, any price in the range of $\underline{\lambda}$ to $\lambda$ supports surplus maximization but would send an incomplete signal since only incremental demand priced above $\lambda$ would be efficient and would change the dispatch price; and only incremental supply priced below $\underline{\lambda}$ would be efficient and would change the dispatch price. This has impact on bilateral transactions outside of the bids and offers considered in the dispatch. A small change in either supply or demand results in a large change in market clearing price (MCP).

Figure 2:
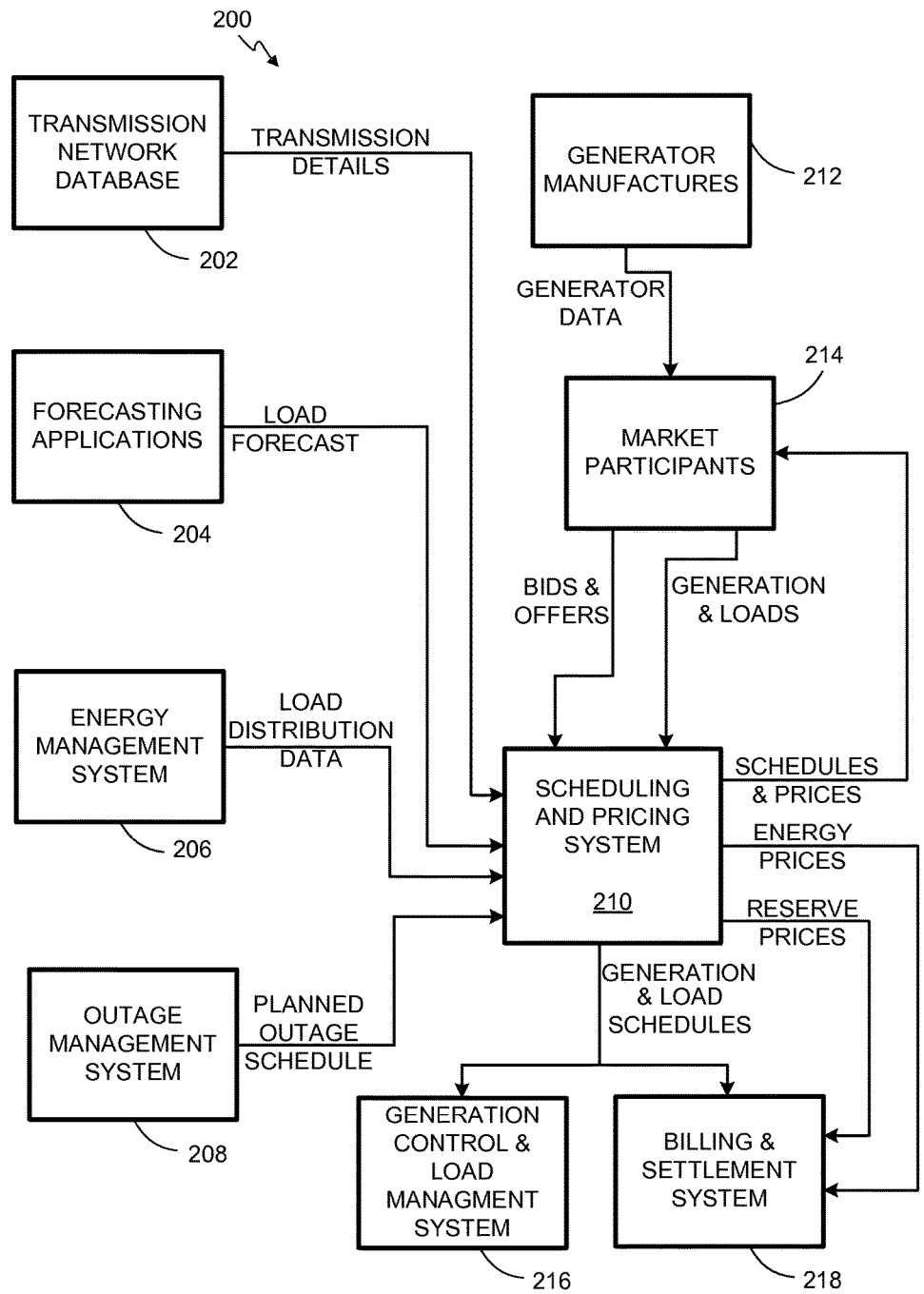
FIG. 2 is a schematic depiction of an example system according to embodiments of the present invention.

Turning now to FIG. 2, a schematic block diagram of an example system 200 according to embodiments of the present invention is provided. The system 200 includes a plurality of data sources including a transmission network database 202 that provides transmission details, forecasting applications 204 that provide load forecasts, an energy management system 206 that provides load distribution data, and an outage management system 208 that provides a planned outage schedule. Each of the data sources provides their respective data to a scheduling and pricing system 210. In addition, generator manufactures 212 provide generator data to market participants 214 who in turn provide bids and offers as well as generation capacity and required loads to the scheduling and pricing system 210. Based on these inputs, the scheduling and pricing system 210 determines generation and load schedules as well as energy and reserve prices. The generation and load schedules are distributed to a generation control and load management system 216 as well as a billing and settlement system 218 and the market participants 214 based on time and location. The energy and reserve prices are also distributed to the billing and settlement system 218 and the market participants 214.

The scheduling and pricing system 210 determines the generation and load schedules and energy and reserve prices based upon a market clearing or dispatch model that incorporates the inputs from the various data sources as a large number of interrelated constraints. The market clearing model is optimized to find the best solution subject to the constraints. Conventional market clearing systems define pricing runs using a linear programming model. For example:

$$\min z = \sum_j c_j x_j$$

s.t.

$$\sum_j a_{ij} x_j = b_i, i = 1, \ldots, m$$

$$x_j \geq 0, j = 1, \ldots, n$$

where z represents welfare which is defined as the surplus of the demand bids over the supply bids over the market horizon (e.g., typically a day for day-ahead markets, shorter for hourly markets, and down to five minutes for real-time markets); j represents an integer index value for market constraint variables from 1 to n; n represents the total number of market constraint variables in the market (e.g., for a market the size of the California Independent System Operator (CAISO), which is a medium size market, there would be approximately 100,000 variables, the number is related to the number of bids in the market); $c_j$ represents price coefficients of the bids; $x_j$ represents levels of supply or demand at price $c_j$ and is a non-negative number; $a_{ij}$ represents a coefficient of the market constraint variable j; $b_i$ represents the requirement levels or transmission equipment capacities in the case of system constraints and the capacities or limitations of the bid resources in the case of resource constraints; i represents an integer index value from 1 to m; and m represents the total number of constraints specified for each time interval of the market. For example, in the day-ahead market there are 24 hourly intervals.

Supply bids will have positive price coefficients and demand bids will negative price coefficients. One bid will typically have more than one coefficient/price for different ranges of supply or demand. For supply bids, the prices are assumed to increase with the amount of supply and for demand bids, the prices are assumed to decrease with the amount of demand.

The market constraint variables can be divided into (1) system constraints that define market requirements for energy and ancillary services collectively referred to as electricity commodities, (2) transmission system constraints (e.g., variables related to power lines, transformers, interfaces, etc.), and (3) resource constraints that define the capabilities and/or limitations of the resources (e.g., generators and loads).

We obtain the market clearing prices from the dual of the above primal. The dual can be expressed as follows:

$$\max w = \sum_i b_i \lambda_i$$

s.t.

$$\sum_i a_{ij} \lambda_i \leq c_j, j = 1, \ldots, n$$

where $b_i$ represents the requirement levels or transmission equipment capacities in the case of system constraints and the capacities or limitations of the bid resources in the case of resource constraints; $\lambda_i$ represents prices; $a_{ij}$ represents a coefficient of the market constraint j; $c_j$ represents price coefficients of the bids; j represents an integer index value from 1 to n; and n represents the total number of variables in the market.

When the linear programming problem has an optimal solution (bounded and feasible), the simplex method of optimizing the above LP model provides simultaneously a pair of corresponding basic solutions to the dual and primal problem.

However, it can be shown by way of some simple examples that the above model leads to a range or multiplicity of market clearing prices. It also can be shown that any published price provides incorrect market signals which could have significant impact on bilateral transactions and that published prices are very unstable. In other words, a slight change in fixed schedules or bids can produce drastically different outcomes. The issue is aggravated by the fact that the variation of the prices can be very large (e.g., $25/MW).

In addition to breaks in the bid curves as illustrated above in FIG. 1, there are many reasons why there can be a range of market clearing prices. In fact, random tests with real production cases show that a multiplicity of prices regularly appears. Such multiplicity of prices is not a system error but rather a feature inherent in the way the market is cleared, or equivalently, the pricing run model. Hence as long as the pricing run is modeled as a liner programming problem, no tweaking or "epsilons" can provide a better solution.

The present inventors have determined that replacing the linear programming model with a quadratic programming (QP) model allows a market clearing system without the multiplicity of prices problem. Thus, the pricing run can be defined as a quadratic programming problem as follows:

$$\min z = \sum_j c_j x_j + \frac{1}{2}\sum_i \varepsilon_i \mu_i^2$$

s.t.

$$\sum_j a_{ij}x_j = \varepsilon_i \mu_i = b_i, i = 1, \ldots, m$$

$$x_j \geq 0, j = 1, \ldots, n$$

where, as above, z represents welfare which is defined as the surplus of the demand bids over the supply bids over the market horizon (e.g., typically a day for day-ahead markets, shorter for hourly markets, and down to five minutes for real-time markets); j represents an integer index value for market constraint variables from 1 to n; n represents the total number of market constraint variables in the market; represents price coefficients of the bids; $x_j$ represents levels of supply or demand at price $c_j$ and is a non-negative number; $\varepsilon_i$ are very small positive numbers (e.g., $\varepsilon_i$=1.e−6); $\mu_i$ represents technical variables introduced only for the constraints that are being priced and which will turn out to be equal to the prices by which the market gets settled; $a_{ij}$ represents a coefficient of the market constraint variable j; $b_i$ represents the requirement levels or transmission equipment capacities in the case of system constraints and the capacities or limitations of the bid resources in the case of resource constraints; i represents an integer index value from 1 to m; and m represents the total number of constraints specified for each time interval of the market. For example, in the day-ahead market there are 24 hourly intervals.

Supply bids will have positive price coefficients and demand bids will negative price coefficients. One bid will typically have more than one coefficient/price for different ranges of supply or demand. For supply bids, the prices are assumed to increase with the amount of supply and for demand bids, the prices are assumed to decrease with the amount of demand.

The market constraint variables can be divided into (1) system constraints that define market requirements for energy and ancillary services collectively referred to as electricity commodities, (2) transmission system constraints (e.g., variables related to power lines, transformers, interfaces, etc.), and (3) resource constraints that define the capabilities and/or limitations of the resources (e.g., generators and loads).

The Karush-Kuhn-Tucker (KKT) conditions, which are the necessary and sufficient conditions for optimality for the above QP problem are:

$$\sum_j a_{ij}x_j = \varepsilon_i \mu_i = b_i, i = 1, \ldots, m$$

$$x_j \geq 0, j = 1, \ldots, n$$

$$\sum_i a_{ij}\lambda_i \leq c_j, j = 1, \ldots, n$$

$$x_j \cdot \left(c_j - \sum_i a_{ij}\lambda_i\right) = 0, j = 1, \ldots, n$$

$$\varepsilon_i \lambda_i - \varepsilon_i \mu_i = 0, i = 1, \ldots, m$$

Note that since $\lambda_i = \mu_i$, i=1, . . . , m, the shadow prices (i.e., market clearing prices) appear directly in the QP. The $\mu^*_i$ i=1, . . . , m solutions of QP are feasible solutions of the original dual problem, i.e. they are valid prices for the dual problem. Since the QP is strictly convex with respect to the $\mu_i$ variables, the dual prices are unique. A non-zero price implies a small violation of the constraint that is proportional to the price. Conversely, a constraint has a zero shadow price only if it has not been violated. Also note that in some embodiments, since our concern is avoiding non-uniqueness of the shadow prices (i.e., market clearing prices) that get published, the $\mu_i$ variables are introduced only for the constraints corresponding to the published prices, i.e. for load balance and ancillary services (AS) requirement constraints, and line and inter-tie congestion constraints. Note that AS include services such as regulation, spinning, non-spinning reserves provided by generators. The requirements for the services are determined by the Independent Systems Operators (ISOs) in order to maintain frequency and reliability criteria/requirements. The AS are also traded (e.g., scheduled and priced) in the electricity markets.

Figure 3:
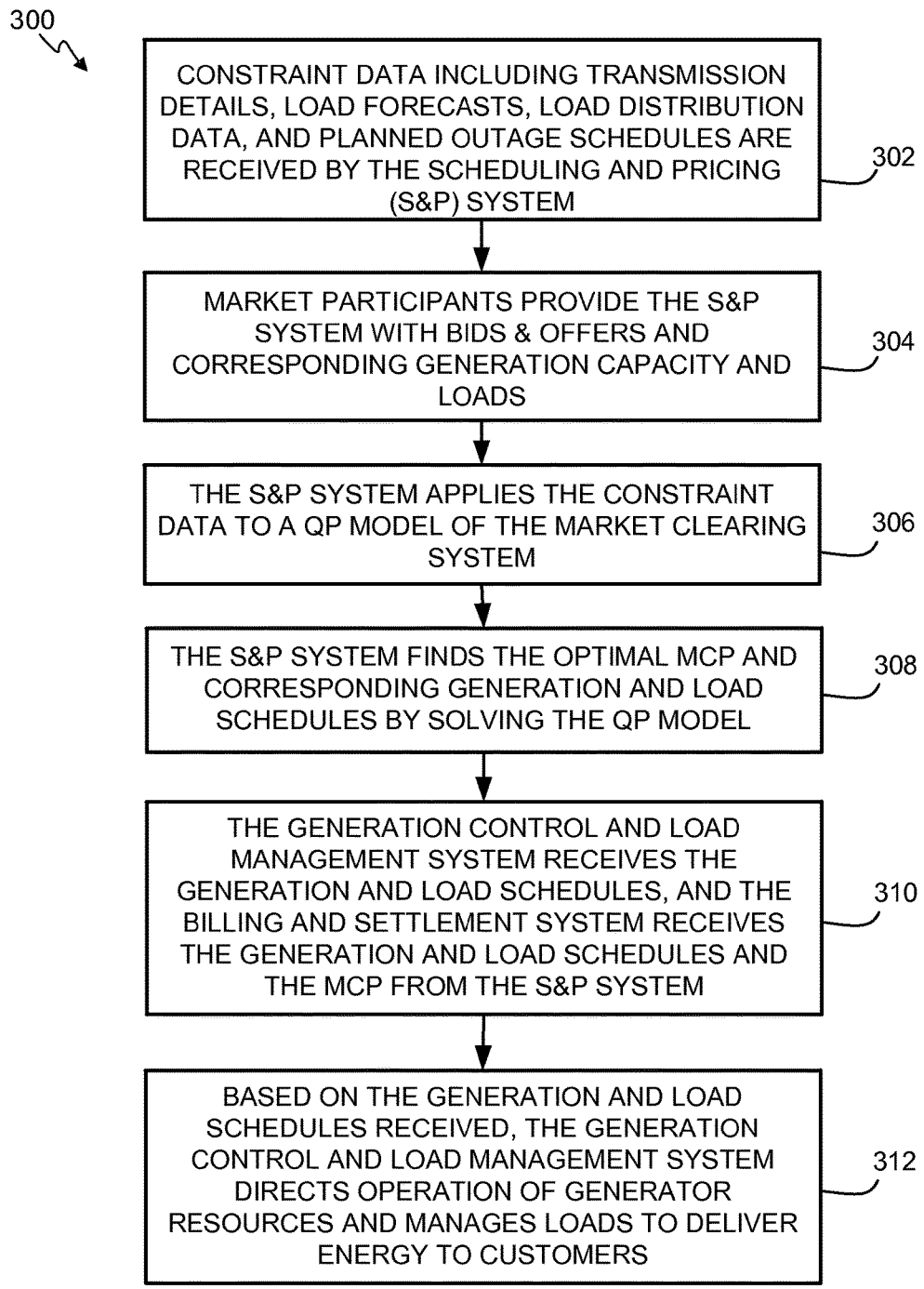
FIG. 3 is a flowchart depicting an example method according to embodiments of the present invention.

FIG. 3 depicts a flowchart illustrating an example of a method 300 according to embodiments of the present invention. Initially, constraint data including transmission details, load forecasts, load distribution data, and planned outage schedules are received by the scheduling and pricing system 210 from the transmission network database 202, the forecasting applications 204, the energy management system 206, and the outage management system 208, respectively (302). The market participants 214 provide the scheduling and pricing system 210 with bids and offers as well as corresponding generation capacity and load requirements (304). The scheduling and pricing system 210 applies the constraint data and information from the market participants 214 to a quadratic programming model of the market clearing system (306). The scheduling and pricing system 210 finds the optimal market clearing prices and corresponding generation and load schedules by solving the quadratic programming (QP) model (308). Note that the solution of the QP model results in a unique market clearing price, avoiding the multiplicity of prices problem described above. Further note that the uniqueness of the market clearing price is obtained at the expense of a small perturbation of the market clearing quantities, and the supply-demand balance constraint compared to conventional solutions that use linear programming models. The generation control and load management system 216 receives the generation and load schedules, and the billing and settlement system 218 receives the generation and load schedules and the market clearing prices from the scheduling and pricing system 210 (310). Based on the generation and load schedules received, the generation control and load management system 216 directs operation of generator resources and manages loads to deliver energy to customers (312).

Figure 4:
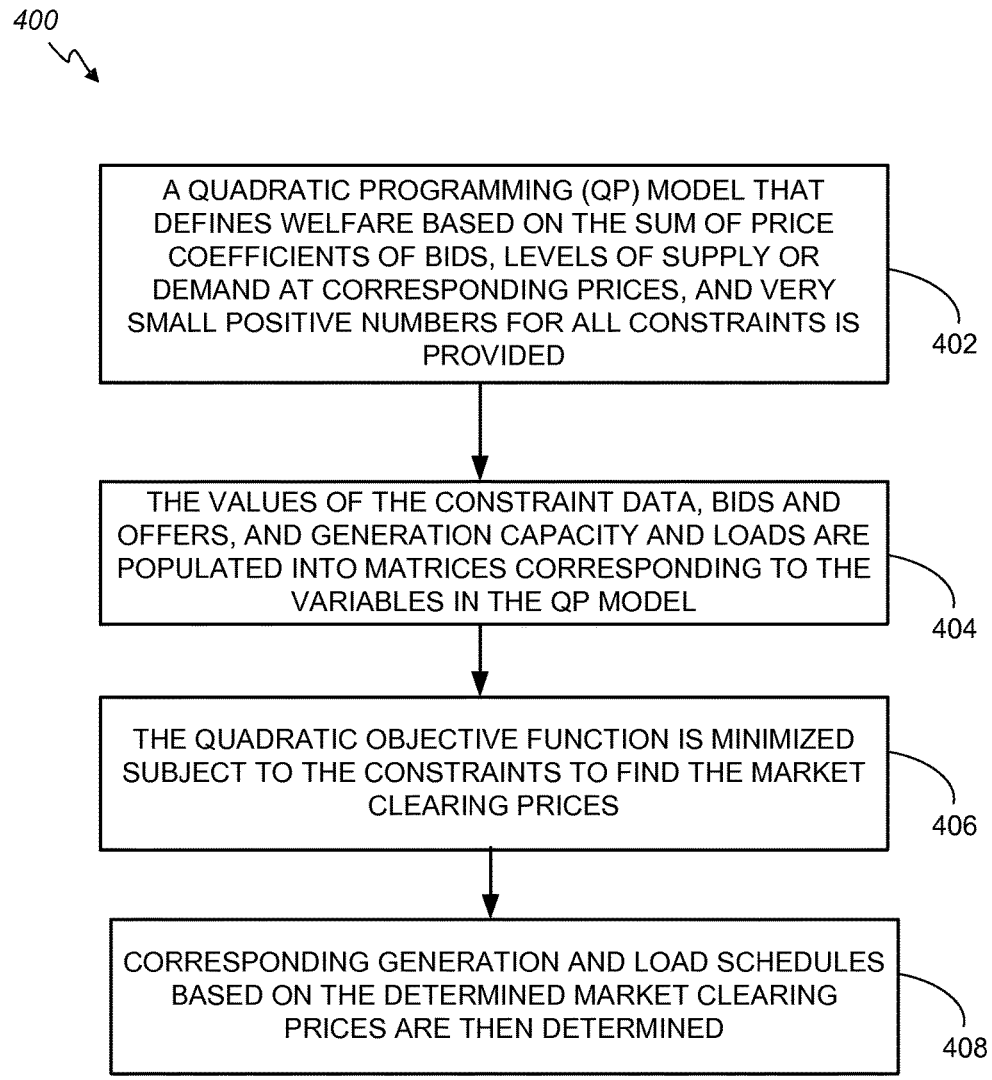
FIG. 4 is a flowchart depicting details of the example method of FIG. 3 according to embodiments of the present invention.

FIG. 4 depicts a flowchart illustrating an example sub-method 400 that details of a portion of method 300 (FIG. 3) according to embodiments of the present invention. Specifically, sub-method 400 includes details of applying the constraint data to a quadratic programming model of the market clearing system and finding the optimal market clearing prices and corresponding generation and load schedules by solving the quadratic programming model. Initially, a quadratic programming (QP) model including a quadratic objective function that defines welfare based on the sum of price coefficients of bids, levels of supply or demand at corresponding prices, and very small positive numbers (e.g., $\varepsilon_i$=1.e−6) for all constraints is provided (402). As discussed above, the QP model can be expressed as follows:

$$\min\left\{z = \sum_j c_j x_j + \frac{1}{2}\sum_i \varepsilon_i \mu_i^2 \,\middle|\, \sum_j a_{ij} x_j + \varepsilon_i \mu_i = b_i,\right.$$
$$\left. i = 1, \ldots, m; x_j \geq 0, j = 1, \ldots, n\right\}$$

As mentioned above, this QP model provides unique market clearing prices and avoids the multiplicity of prices problem described above. Note that the uniqueness of the market clearing price is obtained at the expense of a small perturbation of the market clearing quantities, and the supply-demand balance constraint compared to conventional LP solutions. Specifically, the supply is $\varepsilon \cdot \mu$ short of the demand. A careful choice of the small value for $\varepsilon$ makes the perturbation acceptable in practical application for any reasonable market clearing price values.

Next, the values of the constraint data, bids and offers, and generation capacity and loads are populated into matrices corresponding to the variables in the QP model (404). For example, coefficients of the market constraint variables, the requirement levels or transmission equipment capacities in the case of system constraints and the capacities or limitations of the bid resources in the case of resource constraints can be stored in respective matrices. To find the market clearing prices, the quadratic objective function is minimized subject to the constraints (406). Corresponding generation and load schedules based on the determined market clearing prices are then determined (408).

Figure 5:
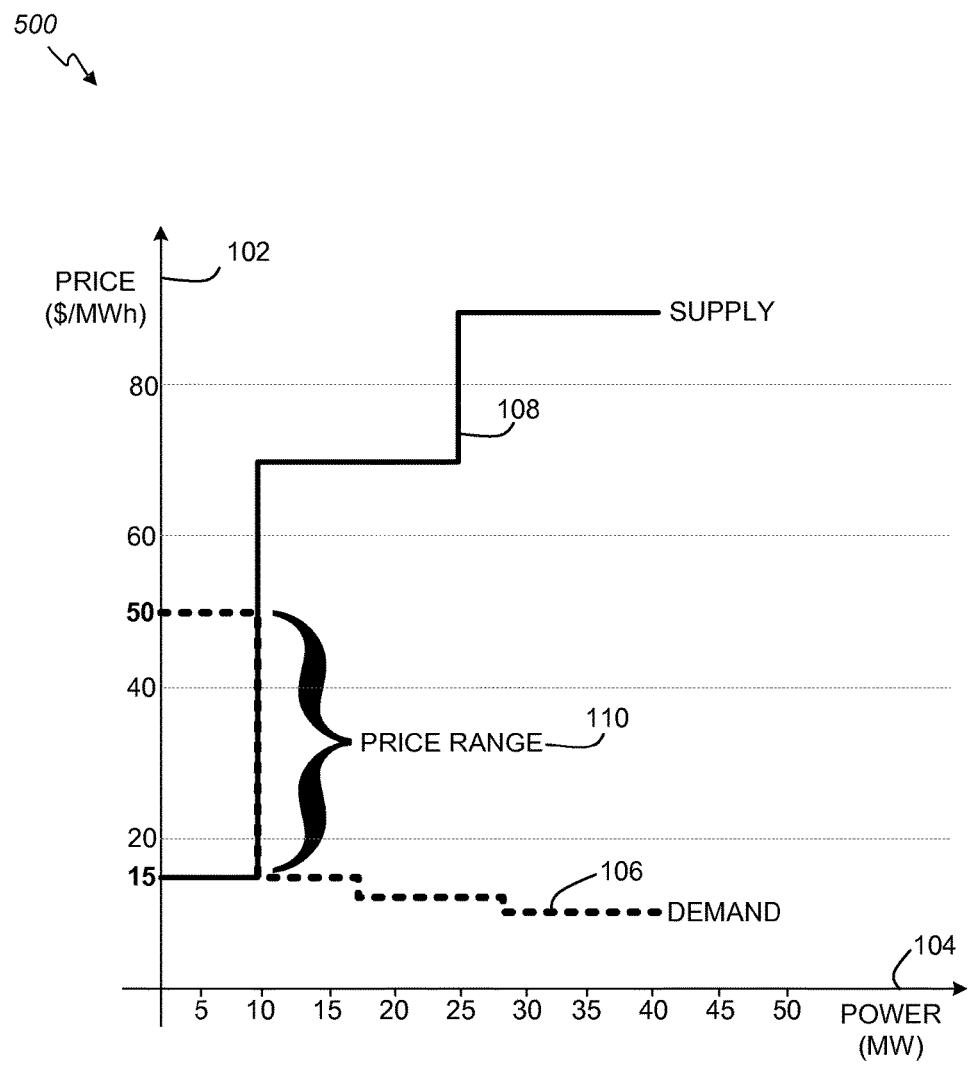
FIG. 5 depicts a second example supply and demand graph provided to illustrate aspects of the present invention.

To further illustrate aspects of embodiments of the invention, consider a simplified representation 500 of a simple single location market at a single instant in time as presented by W. Hogan (Multiple Market-Clearing Prices, Electricity Market Design and Price Manipulation. Mar. 31, 2012, http://www.hks.harvard.edu/fs/whogan/Hogan_Degenrate_Price_033112r.pdf) which is hereby incorporated herein by reference. FIG. 5 depicts a stepwise aggregate supply curve 108 that combines all supply bids into a single curve. In this example, assume there are three generators supplying energy: the first offering up to 10 MW at $15/MWh, the second offering up to 15 MW at $70/MWh, and the third offering 5 MW at $95/MWh (or instead, fewer generators, some of which provide multi-tiered bids). The aggregated demand curve 106 shows that there is a load customer willing to buy up to 10 MW at $50/MWh, another 7 MW at $15/MW, another 10 MW at $13/MWh and so on.

In this case, the market clearing quantity is unique, as shown at 10 MW. However, there is an inherent ambiguity in setting the price as the market clearing price could be set anywhere from $15/MWh to $50/MWh. Simply put, this means that whichever price is chosen from that price range 110, the market equilibrium would be maintained since neither supply nor demand would have incentive to depart from (e.g., supply or take less or more than) 10 MW.

Considering only the first two segments of the aggregate curves (since the remaining segments will not affect the solution), the relevant part of the market solution can be described by the following linear programming problem:

$$\min z = 15x_1 + 70x_2 - 50x_3 - 14x_4 \quad (1)$$

s.t.

$$x_1 + x_2 - x_3 - x_4 = 0 \quad (2)$$

$$0 \leq x_1 \leq 10, \, 0 \leq x_2 \leq 15, \, 0 \leq x_3 \leq 10, \, 0 \leq x_4 \leq 7 \quad (3)$$

where equation (1) is a market objective function to minimize the difference between the cost of supply and value of the demand, equation (2) is the market clearing constraint equating supply and demand of the constraint being priced, and equations (3) are the supply and demand capacities. It is easy to verify that $$x_1 = x_3 = 10, \, x_2 = x_4 = 0$$

are the optimal market clearing quantities. Based on FIG. 5, or equivalently from the dual of the above linear programming problem, we can conclude that any price in the range $15 \leq \lambda \leq 50$ is an optimal market clearing price.

Now consider an improved QP model of the market:

$$\min z = 15x_1 + 70x_2 - 50x_3 - 14x_4 + \frac{1}{2} \cdot 10^{-5} \cdot \mu^2 \quad (1)$$

s.t.

$$x_1 + x_2 - x_3 - x_4 + 10^{-5} \cdot \mu = 0 \quad (2)$$

$$0 \leq x_1 \leq 10, \, 0 \leq x_2 \leq 15, \, 0 \leq x_3 \leq 10, \, 0 \leq x_4 \leq 7 \quad (3)$$

It is easy to verify via the KKT conditions that the optimal solution of the above QP problem is:

$\mu = 15$ $x_1 = 10 - 15 \cdot 10^{-5} = 9.99985$ $x_2 = 0$ $x_3 = 10$ $x_4 = 0$ The solution is unique with respect to the $\mu$ variable. Since $\lambda = \mu$, it follows that the market clearing price is unique. Note that the uniqueness of the market clearing price is obtained at the expense of a small perturbation of the market clearing quantities, and the supply-demand balance constraint compared to the original (LP) solution. Specifically, now the supply is $\varepsilon \cdot \mu$ short of the demand. A careful choice of the small value for s makes the perturbation acceptable in practical application for any reasonable market clearing price values.

The foregoing description discloses only exemplary embodiments of the invention. Modifications of the above disclosed apparatus and methods which fall within the scope of the invention will be readily apparent to those of ordinary skill in the art. For example, although the examples discussed above are illustrated for an electricity market, embodiments of the invention can be implemented for other markets.

Accordingly, while the present invention has been disclosed in connection with exemplary embodiments thereof, it should be understood that other embodiments may fall within the spirit and scope of the invention, as defined by the following claims.

What is claimed is:

1. A method of operating a power system to deliver energy at a market clearing price, the method comprising:
    receiving constraints within a scheduling and pricing system;
    receiving bids with corresponding generation capacity and offers with corresponding load requirements, within the scheduling and pricing system;
    applying the constraints, the bids, the generation capacity, the offers, and the load requirements to a quadratic programming model of a market clearing system within the scheduling and pricing system wherein the quadratic programming model includes a relaxation of all pricing constraints that are epsilon proportional to the market clearing price of the constraints;

determining market clearing prices and corresponding generation and load schedules based on optimizing the quadratic programming model of the market clearing system;

distributing the market clearing prices and the corresponding generation and load schedules to a billing and settlement system;

distributing each generation and load schedule to a generation control and load management system; and controlling operation of generator resources and managing loads by the generation control and load management system to deliver energy to customers based on the generation and load schedules.

2. The method of claim 1 wherein applying the constraints, the bids, the generation capacity, the offers, and the load requirements to the quadratic programming model of the market clearing system includes applying the constraints, the bids, the generation capacity, the offers, and the load requirements to the quadratic programming model that includes a sum of squares of the market clearing prices multiplied by a fraction of epsilon added into an objective function of the quadratic programming model.

3. The method of claim 2 wherein epsilon is approximately $10^{-6}$ or smaller.

4. The method of claim 3 wherein the fraction of epsilon is ½.

5. The method of claim 1 wherein the quadratic programming model of the market clearing system is expressed as:

$$\min\left\{z = \sum_j c_j x_j + \frac{1}{2}\sum_i \varepsilon_i \mu_i^2 \;\middle|\; \sum_j a_{ij} x_j + \varepsilon_i \mu_i = b_i, \right.$$
$$\left. i = 1, \ldots, m; x_j \geq 0, j = 1, \ldots, n\right\}$$

wherein z represents welfare, j represents a first integer index value for market constraint variables from 1 to n; n represents a total number of market constraint variables in a market; $c_j$ represents price coefficients of the bids; $x_j$ represents levels of supply or demand at price $c_j$ and is a non-negative number; $\varepsilon_i$ represents positive numbers; $\mu_i$ represents technical variables introduced only for constraints that are being priced and which will turn out to be equal to prices by which the market gets settled; $a_{ij}$ represents a coefficient of market constraint variable j; $b_i$ represents constraints; i represents a second integer index value from 1 to m; and m represents a total number of constraints specified for each time interval of the market.

6. A system for delivering energy at a market clearing price, the system comprising:

a scheduling and pricing system including a quadratic programming model of a market clearing system;

a plurality of input information sources in communication with the scheduling and pricing system;

a generation control and load management system in communication with the scheduling and pricing system; and a billing and settlement system in communication with the scheduling and pricing system, wherein the scheduling and pricing system is operative to receive constraints, bids with corresponding generation capacity, and offers with corresponding load requirements from the plurality of input information sources, wherein the scheduling and pricing system is further operative to:

determine market clearing prices and corresponding generation and load schedules based on optimizing the quadratic programming model of the market clearing system with the received constraints, bids with corresponding generation capacity, and offers with corresponding load requirements, wherein the quadratic programming model includes a relaxation of all pricing constraints that are epsilon proportional to the market clearing price of the constraints;

distribute the market clearing prices and the corresponding generation and load schedules to the billing and settlement system; and distribute each generation and load schedule to the generation control and load management system wherein the generation control and load management system is operative to direct control operation of generator resources and manage loads to deliver energy to customers based on the generation and load schedule.

7. The system of claim 6 wherein the quadratic programming model includes a sum of squares of the market clearing prices multiplied by a fraction of epsilon added into an objective function of the quadratic programming model.

8. The system of claim 7 wherein epsilon is approximately $10^{-6}$ or smaller.

9. The system of claim 8 wherein the fraction of epsilon is ½.

10. The system of claim 6 wherein the quadratic programming model of the market clearing system is expressed as:

$$\min\left\{z = \sum_j c_j x_j + \frac{1}{2}\sum_i \varepsilon_i \mu_i^2 \;\middle|\; \sum_j a_{ij} x_j + \varepsilon_i \mu_i = b_i, \right.$$
$$\left. i = 1, \ldots, m \wedge x_j \geq 0, j = 1, \ldots, n\right\}$$

wherein z represents welfare, j represents a first integer index value for market constraint variables from 1 to n; n represents a total number of market constraint variables in a market; $c_j$ represents price coefficients of the bids; $x_j$ represents levels of supply or demand at price $c_j$ and is a non-negative number; $\varepsilon_i$ represents positive numbers; $\mu_i$ represents technical variables introduced only for constraints that are being priced and which will turn out to be equal to prices by which the market gets settled; $a_{ij}$ represents a coefficient of market constraint variable j; $b_i$ represents constraints; i represents a second integer index value from 1 to m; and m represents a total number of constraints specified for each time interval of the market.

11. The system of claim 6 wherein the plurality of input information sources includes at least one of a transmission network database, forecasting applications, an energy management system, and an outage management system.

12. The system of claim 11 wherein the plurality of input information sources includes market participants.

13. A system for delivering energy at a market clearing price, the system comprising:

a processor; and a memory coupled to the processor and storing processor executable instructions to:

receive constraints within a scheduling and pricing system;

receive bids with corresponding generation capacity and offers with corresponding load requirements, within the scheduling and pricing system;

apply the constraints, the bids, the generation capacity, the offers, and the load requirements to a quadratic programming model of a market clearing system within the scheduling and pricing system, wherein the quadratic programming model includes a relaxation of all pricing constraints that are epsilon proportional to the market clearing price of the constraints;

determine market clearing prices and corresponding generation and load schedules based on optimizing the quadratic programming model of the market clearing system;

distribute the market clearing prices and the corresponding generation and load schedules to a billing and settlement system;

distribute each generation and load schedule to a generation control and load management system; and control generator resources and manage loads to deliver energy to customers based on the generation and load schedule.

14. The system of claim 13 wherein the instructions to apply the constraints, the bids, the generation capacity, the offers, and the load requirements to the quadratic programming model of the market clearing system includes instructions to apply the constraints, the bids, the generation capacity, the offers, and the load requirements to the quadratic programming model that includes a sum of squares of the market clearing prices multiplied by a fraction of epsilon added into an objective function of the quadratic programming model.

15. The system of claim 14 wherein epsilon is approximately $10^{-6}$ or smaller.

16. The system of claim 15 wherein the fraction of epsilon is ½.

17. The system of claim 13 wherein the quadratic programming model of the market clearing system is expressed as:

$$\min\left\{z = \sum_j c_j x_j + \frac{1}{2}\sum_i \varepsilon_i \mu_i^2 \,\middle|\, \sum_j a_{ij} x_j + \varepsilon_i \mu_i = b_i, \right.$$
$$\left. i = 1, \ldots, m \wedge x_j \geq 0, j = 1, \ldots, n\right\}$$

wherein z represents welfare, j represents a first integer index value for market constraint variables from 1 to n; n represents a total number of market constraint variables in a market; $c_j$ represents price coefficients of the bids; $x_j$ represents levels of supply or demand at price $c_j$ and is a non-negative number; $\varepsilon_i$ represents positive numbers; $\mu_i$ represents technical variables introduced only for constraints that are being priced and which will turn out to be equal to prices by which the market gets settled; $a_{ij}$ represents a coefficient of market constraint variable j; $b_i$ represents constraints; i represents a second integer index value from 1 to m; and m represents a total number of constraints specified for each time interval of the market.

* * * * *